US012067529B2

(12) United States Patent
Beyer

(10) Patent No.: US 12,067,529 B2
(45) Date of Patent: Aug. 20, 2024

(54) BUNDLING LINE ITEM BASED EVENTS IN AN EVENT-DRIVEN ARCHITECTURE

(71) Applicant: SAP SE, Walldorf (DE)

(72) Inventor: Bertram Beyer, Nussloch (DE)

(73) Assignee: SAP SE, Walldorf (DE)

( * ) Notice: Subject to any disclaimer, the term of this patent is extended or adjusted under 35 U.S.C. 154(b) by 307 days.

(21) Appl. No.: 17/375,280

(22) Filed: Jul. 14, 2021

(65) Prior Publication Data

US 2023/0014255 A1    Jan. 19, 2023

(51) Int. Cl.
*G06Q 10/0875* (2023.01)
*G06Q 10/107* (2023.01)
*G06Q 40/12* (2023.01)

(52) U.S. Cl.
CPC ....... *G06Q 10/0875* (2013.01); *G06Q 10/107* (2013.01); *G06Q 40/12* (2013.12)

(58) Field of Classification Search
None
See application file for complete search history.

(56) References Cited

U.S. PATENT DOCUMENTS

| | | | |
|---|---|---|---|
| 9,389,929 B1* | 7/2016 | Eshwar | G06F 16/22 |
| 10,241,651 B2 | 3/2019 | Beyer et al. | |
| 10,262,075 B2 | 4/2019 | Schaerges et al. | |
| 10,684,940 B1* | 6/2020 | Kayal | G06F 11/3664 |
| 10,728,120 B2 | 7/2020 | Beyer | |
| 10,817,351 B1* | 10/2020 | Soura | G06F 9/44521 |
| 2007/0250545 A1* | 10/2007 | Surlaker | G06F 16/2358 |
| 2009/0070785 A1* | 3/2009 | Alvez | H04L 67/61 |
| | | | 719/318 |
| 2009/0171974 A1* | 7/2009 | Arthursson | H04L 67/02 |
| 2014/0380290 A1* | 12/2014 | Auerbach | G06F 8/433 |
| | | | 717/156 |
| 2019/0014171 A1* | 1/2019 | Stein | G06F 9/5027 |

(Continued)

OTHER PUBLICATIONS

Docs.microsoft.com [online], "Domain events: design and implementation" Oct. 2018 [retrieved on Jul. 15, 2021], retrieved from: URL < https://docs.microsoft.com/en-us/dotnet/architecture/microservices/microservice-ddd-cqrs-patterns/domain-events-design-implementation>, 20 pages.

(Continued)

*Primary Examiner* — Fateh M Obaid
(74) *Attorney, Agent, or Firm* — Fish & Richardson P.C.

(57) ABSTRACT

The present disclosure involves systems, software, and computer implemented methods for bundling line item based events in an event-driven architecture. One example method includes receiving, at a message outbox of a first microservice, a new line-item based event. A determination is made as to whether a compatible open event bundle can be located. In response to locating the compatible open event bundle, the compatible open event bundle is updated to include the new line-item based event. In response to determining that the compatible open event bundle cannot be located, the compatible open event bundle is created as a new open event bundle and the new open event bundle is updated to include the new line-item based event. The compatible open event bundle is closed in response to a closing condition. A bundled event message is generated and sent to a second microservice.

20 Claims, 13 Drawing Sheets

(56) References Cited

U.S. PATENT DOCUMENTS

2022/0245131 A1* 8/2022 Loeb .................... G06F 9/54
2022/0334857 A1* 10/2022 Lam .................... G06F 9/5077

OTHER PUBLICATIONS

Kafka.apache.org [online], "Kafka Protocol Guide" 2017 [retrieved on Jul. 15, 2021], retrieved from: URL <http://kafka.apache.org/protocol.html>, 422 pages.
Microservices.io [online], "Pattern Transactional Outbox" Jul. 2019, [retrieved on Jul. 15, 2021], retrieved from: URL <https://microservices.io/patterns/data/transactional-outbox.html>, 3 pages.
Reactivemanifesto.org [online], "The Reactive Manifesto" Sep. 2014 [retrieved on Jul. 15, 2021], retrieved from: URL <https://www.reactivemanifesto.org/>, 2 pages.

* cited by examiner

Outbox Event Table

| Event ID | Event Time | Event Type | Requisition ID | Payload |
|---|---|---|---|---|
| 1 | 2021-03-19 8:30:01 | ItemApproved | 4711 | ... |
| 2 | 2021-03-19 8:30:16 | ItemApproved | 4711 | ... |
| 3 | 2021-03-19 8:30:26 | ItemApproved | 4711 | ... |
| 4 | 2021-03-19 8:31:00 | ItemApproved | 4711 | ... |

FIG. 6A

Outbox Event Bundle Table

| Bundle Id | Event Type | Requisition ID | Start Time | End Time | Event Counter |
|---|---|---|---|---|---|
| 1 | ItemApproved | 4711 | 2021-03-19 8:30:01 | 2021-03-19 8:31:01 | 4 |

FIG. 6B

| Bundling Parameter | Parameter Value |
|---|---|
| Ordering Criterion _1002_ | Requisition Identifier _1004_ |
| Maximum Line Items Per Bundle _1006_ | 4 _1008_ |
| Maximum Delay _1010_ | 60 seconds _1012_ |

| Event ID | Event Time | Event Type | Requisition ID | Payload |
|---|---|---|---|---|
| 1 | 2021-03-19 8:30:01 _1044_ | ItemApproved | 4711 _1046_ | ... |
| 2 | 2021-03-19 8:30:16 | ItemApproved | 4711 | ... |
| 3 | 2021-03-19 8:30:20 _1054_ | ItemWithdrawn | 4712 _1056_ | ... |
| 4 | 2021-03-19 8:30:26 | ItemApproved | 4711 | ... |
| 5 | 2021-03-19 8:31:00 | ItemApproved | 4711 | ... |

| Bundle ID | Event Type | Requisition ID | Start Time | End Time | Event Counter |
|---|---|---|---|---|---|
| 1 _1062_ | ItemApproved | 4711 _1064_ | 2021-03-19 8:30:01 | 2021-03-19 8:31:01 | 1-2-3-4 _1071_ |
| 2 _1072_ | ItemWithdrawn | 4712 _1076_ | 2021-03-19 8:30:20 | 2021-03-19 8:31:20 | 1 _1081_ |

| Event ID | Event Time | Event Type | Requisition ID | Payload |
|---|---|---|---|---|
| 1 | 2021-03-19 8:30:01 _1104_ | ItemApproved | 4711 _1106_ | ... |
| 2 | 2021-03-19 8:30:16 | ItemApproved | 4711 | ... |
| 3 | 2021-03-19 8:30:20 _1114_ | ItemWithdrawn | 4711 _1116_ | ... |
| 4 | 2021-03-19 8:30:26 _1122_ | ItemApproved | 4711 _1120_ | ... |
| 5 | 2021-03-19 8:31:00 | ItemApproved | 4711 | ... |

FIG. 11B

| Bundle ID | Event Type | Requisition ID | Start Time | End Time | Event Counter |
|---|---|---|---|---|---|
| 1 | ItemApproved | 4711 _1154_ | 2021-03-19 8:30:01 | 2021-03-19 8:31:01 | 1 + 2 _1161_ |
| 2 _1164_ | ItemWithdrawn | 4711 _1166_ | 2021-03-19 8:30:20 | 2021-03-19 8:31:20 | 1 _1171_ |
| 3 | ItemApproved | 4711 _1176_ | 2021-03-19 8:30:26 | 2021-03-19 8:31:26 | 1 + 2 _1181_ |

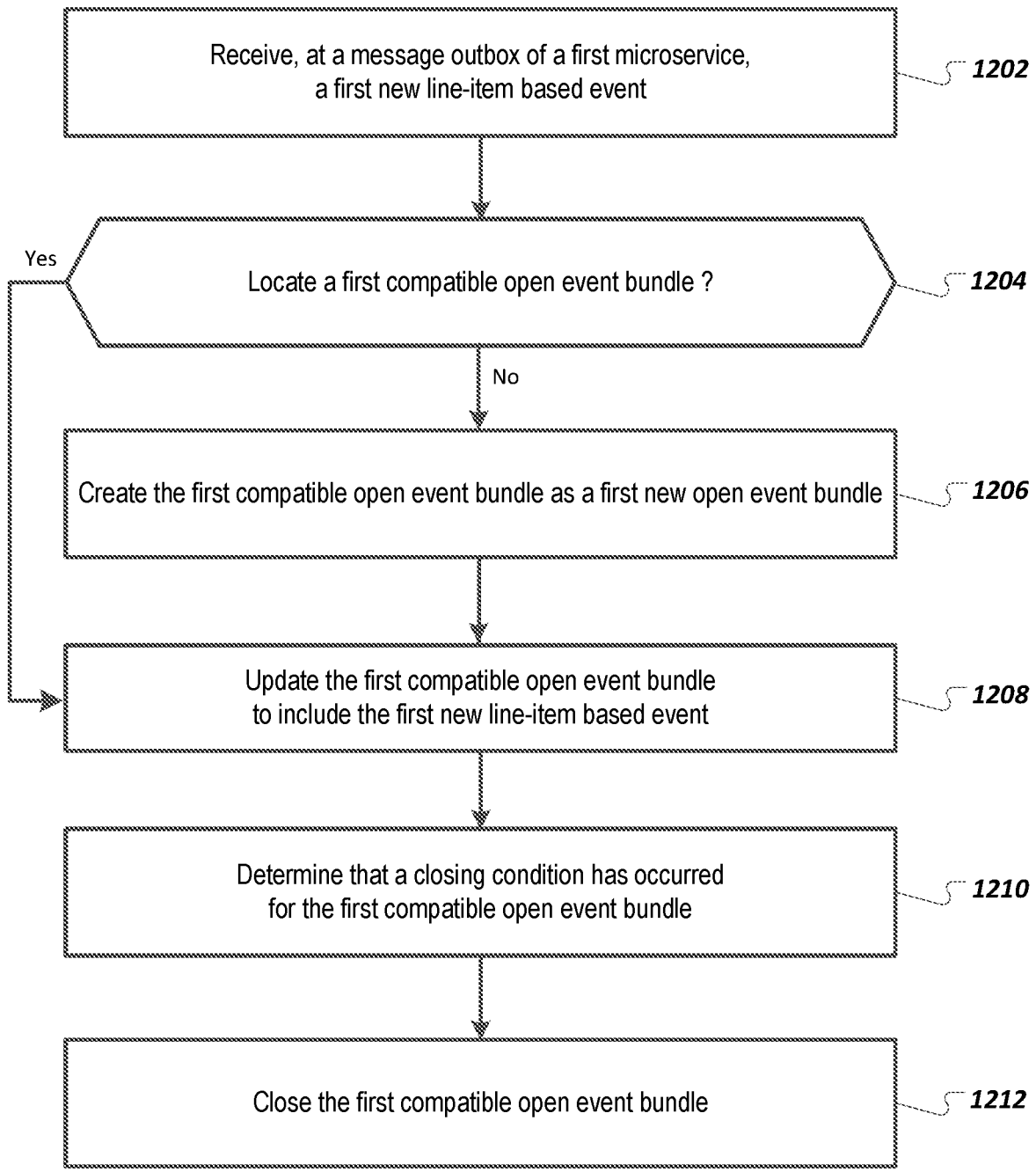
FIG. 12  *1200*

BUNDLING LINE ITEM BASED EVENTS IN
AN EVENT-DRIVEN ARCHITECTURE

TECHNICAL FIELD

The present disclosure relates to computer-implemented methods, software, and systems for bundling line item based events in an event-driven architecture.

BACKGROUND

Enterprises can use procurement software to enable employees to purchase required materials. The enterprise can have policies and workflows that define limits of an employee purchase process. For example, policies and/or workflows can define what materials can be purchased and from what suppliers, which department pay for which items, whether a department has enough budget to pay for items, which approvers approve which items, or other rules or limits. An employee can initiate a purchase process by submitting an internal purchase request document. The purchase request document can be processed and transformed into a purchase order document. The purchase order can be used for ordering the requested material from a supplier. The supplier can deliver the ordered material together with an invoice document.

SUMMARY

The present disclosure involves systems, software, and computer implemented methods for bundling line item based events in an event-driven architecture. An example method includes: receiving, at a message outbox of a first microservice, a first new line-item based event; determining whether a first compatible open event bundle can be located; in response to locating the first compatible open event bundle, updating the first compatible open event bundle to include the first new line-item based event; in response to determining that the first compatible open event bundle cannot be located: creating the first compatible open event bundle as a first new open event bundle; and updating the first new open event bundle to include the first new line-item based event; determining that a closing condition has occurred for the first compatible open event bundle; and closing the first compatible open event bundle, wherein the closing comprises: generating a first bundled event message based on the first compatible open event bundle; and sending the first bundled event message to a second microservice.

Implementations may include one or more of the following features. The first new line-item based event can include a first line item, a first event type, and a first document identifier. Locating the first compatible open event bundle can include locating an open event bundle that has a same event type as the first event type. Locating the first compatible open event bundle can include locating an open event bundle that has a same event type as the first event type and a same document identifier as the first document identifier. Document identifiers can serve as a ordering criterion for grouping line-item based events of a same event type and same document instance and maintaining an order of line-item based events of the same event type within a given bundled event message. Determining that the closing condition has occurred for the first compatible open event bundle can include determining that the first compatible open event bundle includes a predefined maximum number of events. Determining that the closing condition has occurred for the first compatible open event bundle can include determining that a predefined maximum amount of time has occurred since the first compatible open event bundle was created. Determining that the closing condition has occurred for the first compatible open event bundle can include receiving, at the message outbox, a second new line-item based event that has a same document identifier as the first document identifier but a different event type than the first event type. After closing the first open compatible event bundle, a second new open event bundle can be created. The second new line-item based event can be added to the second new open event bundle. Determining whether the first compatible open event bundle can be located can include locating a first incompatible open event bundle that includes a same document identifier as the first document identifier but a different event type than the first event type. The first incompatible open event bundle can be closed before creating the first compatible open event bundle. Generating the first bundled event message based on the first compatible open event bundle can involve including a respective line item in the bundled event message for each line item included in the first compatible open event bundle. Generating the first bundled event message based on the first compatible open event bundle can include creating aggregate line item information from the line items included in the first bundled event message and including the aggregate line item information in the first bundled event message. Closing the first compatible open event bundle can include deleting events associated with the first bundled event message from the message outbox.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 6A illustrates an example outbox event table.
FIG. 6B illustrates an example outbox event bundle table.
FIGS. 10A-10C illustrate a first example of bundle creation.
FIGS. 11A-11B illustrate a second example of bundle creation.

FIG. 12 is a flowchart of an example method for bundling line item based events in an event-driven architecture.

DETAILED DESCRIPTION

A data model may include items that represent documents that include a list of line items. Processes that act on data defined by the data model may process line items to automatically change the state of the line items. In an event-driven microservice architecture, line item processing of many line items can result in a high system load. For example, events can include metadata and a payload. Metadata can be a required messaging overhead, to route and process the payload correctly. However, for line items, a payload can include a header and specific information for a line item. A header may include information that a consumer of line item events may consider redundant. Accordingly, a repeated receiving of the redundant header may not be a payload of interest for the consumer. A header payload portion that is not of interest to a consumer can be considered additional overhead. Having many events with small payloads of interest compared to overhead can be inefficient and can increase an overall load on the system. To reduce overhead, improve system and network efficiency, reduce a load on a messaging architecture, and save costs, a configurable bundling of line item events can be performed.

Figure 1:
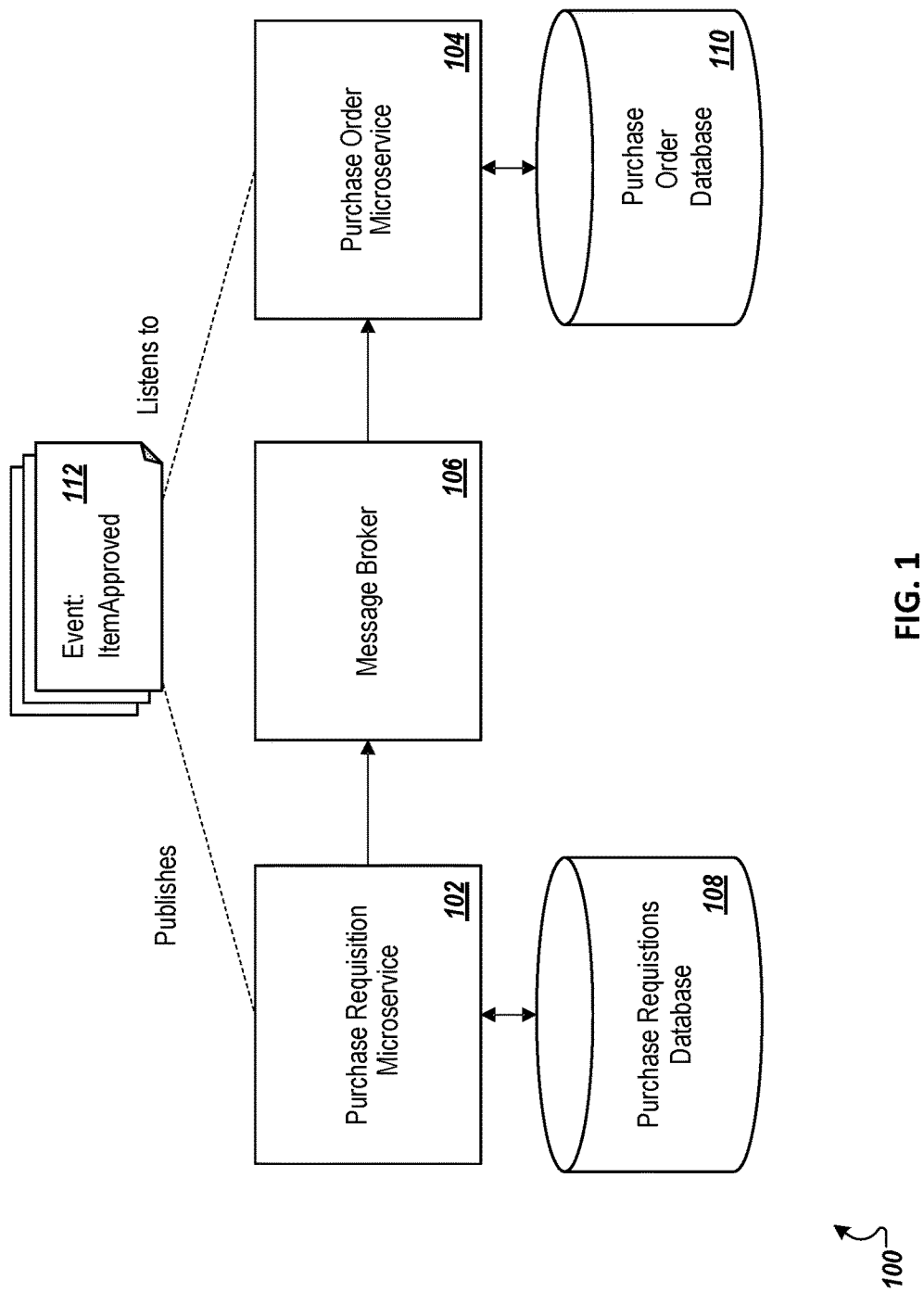
FIG. 1 illustrates an example system for procurement processing.

FIG. 1 illustrates an example system 100 for procurement processing. An example of processes that act on line item data structures are procurement processes. Although procurement processes are described as example processes, other types of processes can act on line item data structures. Enterprises can run procurement software to provide employees a governed environment to purchase required materials. In the governed environment, the enterprise can have policies and workflows that define boundaries of an employee's buying process. For example, workflows and policies can define boundaries and conditions such as what materials can be purchased, from what suppliers, to be paid by which department, as part of which budget amounts, to be approved by which approvers, etc. Enterprise workflows can involve various types of documents that involve line items.

For example, a purchasing process for an employee can start with a submission of a purchase request document. The purchase request document can be an internal document that gets processed and transformed into a purchase order document. A purchase order document can be a legal document that can be used for ordering requested material from a supplier. The supplier can deliver the ordered material together with an invoice document. In some cases, the employee who initiated the order can complete a goods recipe document. Each of the purchase request document, the purchase order document, the invoice document, and the goods recipe document can include a header portion and multiple line items. Line items can include information that describes a material, an ordered quantity, a price per unit, a supplier, or a purchasing status. The header can include general information such as a requestor, a currency, or information that is aggregated from the line items such as a total price or an overall purchasing status. A given document may include one, several, or even hundreds or thousands of line items.

Modern cloud applications can use multiple microservices. For example, the system 100 includes a purchase requisition microservice 102 and a purchase order microservice 104. Communication between microservices can be decoupled by using message brokers such as a message broker 106. Use of microservices and message brokers can provide a resilient, responsive, and elastic system.

Messages communicated within the system 100 can include domain events. A domain event, as part of a domain-driven design approach, can include information about a fact that happened in the past. For example, domain events can inform about changes that happened in a domain object owned by a microservice that were persisted in data base associated with the service. For example, the purchase requisition microservice 102 interfaces with a purchase requisition database 108 and the purchase order microservice 104 interfaces with a purchase order database 110. An outbox pattern can be used to ensure that a domain event will be eventually sent using the message broker 106 even if the message broker 106 is intermittently unavailable. For example, an outbox pattern implementation can include storing a domain event with an originating domain object change in the database of a microservice. The microservice can read the events from the outbox and send the events via the message broker 106 and retry the sending if needed.

In the system 100, the purchase requisition microservice 102 is responsible for the purchase requisition domain. For example, the purchase requisition microservice 102 includes APIs (Application Programming Interfaces), logic, and persistency to create and process purchase requisition documents. The purchase order microservice 104 is responsible for the purchase order domain. For example, the purchase order microservice 104 includes APIs, logic, and persistency to create and process purchase order documents. The purchase requisition microservice 102 publishes ItemApproved events 112 and the purchase order microservice 104 listens to (e.g., listens for) ItemApproved events 112.

Figure 2:
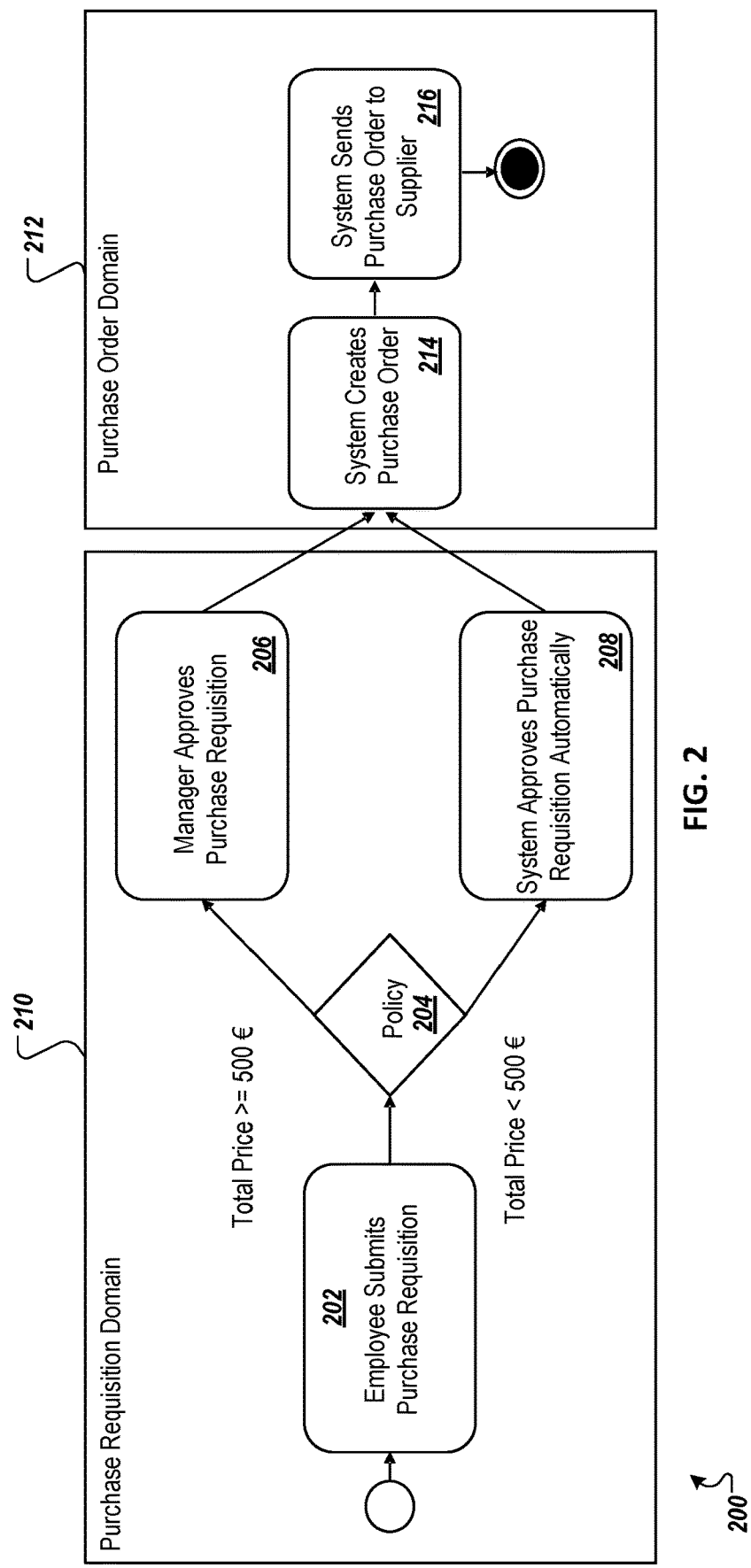
FIG. 2 illustrates an example procurement process.

FIG. 2 illustrates an example procurement process 200. At 202, an employee of a company creates and submits a purchase requisition. The company has defined a policy which says that orders with a price higher than or equals 500€ must be approved manually by the employee's manager. If the price is below the 500€, the system can approve the request automatically. Accordingly, a policy condition check can be performed, at 204, to determine whether the total price of the order is greater than or equal to 500€. If the total price of the order is greater than or equal to 500€, the purchase requisition can be provided to the manager who can decide whether to approve the purchase requisition. For example, at 206, the manager approves a given purchase requisition. If the total price of the order is less than 500€, the system, at 208, can automatically approve the purchase requisition. Steps 202, 204, 206, and 208 can be defined as part of a purchase requisition domain 210. For instance, the steps 202, 204, 206, and 208 can be implemented in a purchase requisition microservice such as the purchase requisition microservice 102. The purchase requisition microservice associated with the purchase requisition domain 210 can interface with a purchase order microservice (e.g., the purchase order microservice 104) that is associated with a purchase order domain 212.

For example, purchase order activities can be defined as part of the purchase order domain 212. The purchase order domain 212 can include a purchase order creation step 214 and a purchase order sending step 216. The purchase order creation step 214 can be performed in response to detection of an event published by the purchase requisition microservice. For instance, in response to a manager or automatic system approval, the purchase requisition microservice can publish an ItemApproved event. The purchase order microservice can listen for ItemApproved events, and can invoke the purchase order creation step 214 when an ItemApproved event occurs. The purchase order microservice can perform the purchase order sending step 216 to send the created purchase order to a supplier. As mentioned above, other types of documents can be created and other processes can be performed, with each document and each process involving a list of line items.

Figure 3A:
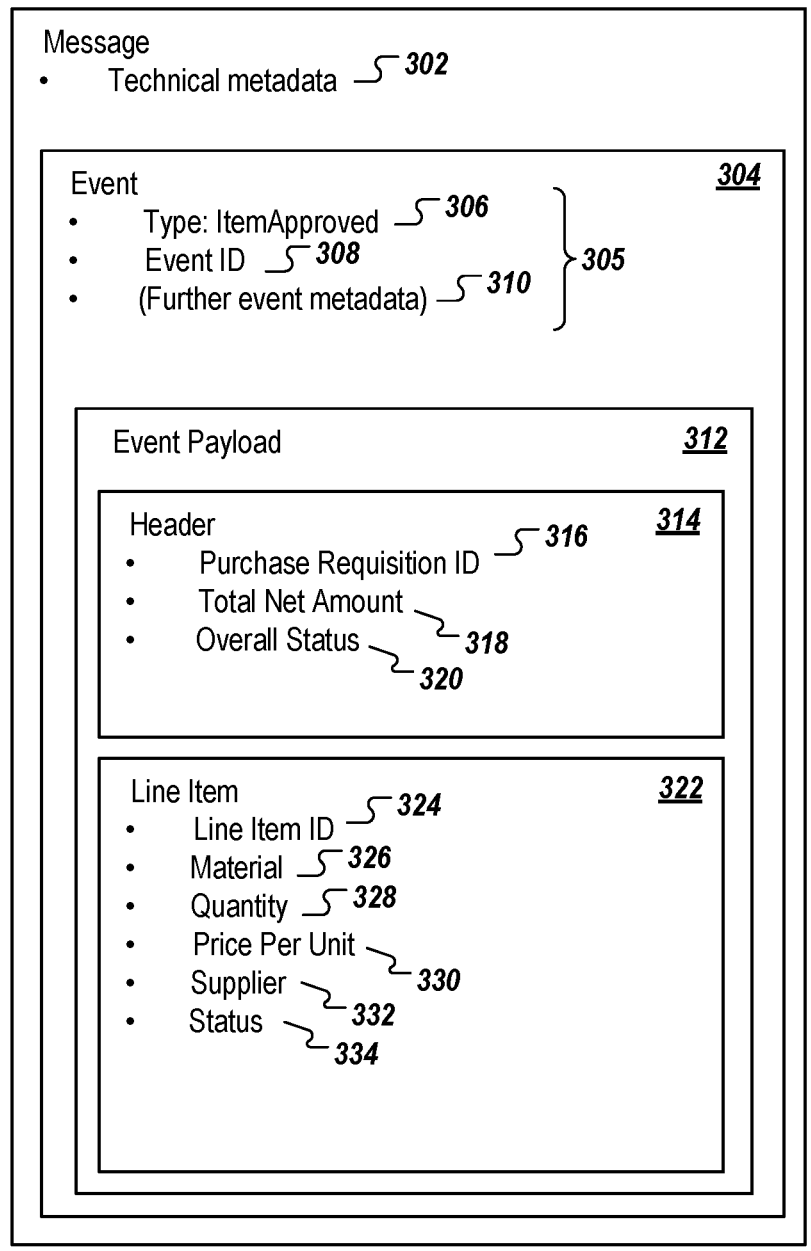
FIG. 3A illustrates an example message.

FIG. 3A illustrates an example message 300. The message 300 includes technical metadata 302 that includes information for message processing and routing by a message broker. The message 300 also includes an event 304. The event 304 includes event metadata 305, such as an event type 306 (e.g., ItemApproved, Withdrawn, etc.), an event identifier 308, or other event metadata 310.

The event metadata 305 can be used by a receiving application or microservice when processing the event. For example, the event type 306 can be used to determine which process is invoked to handle the event. For example, the event type 306 in the example message 300 has a value of ItemApproved, and a particular process may be invoked to handle approved events. The event type 306 can also be used for filtering and/or routing in the system.

The event 304 also includes an event payload 312. The event payload 312 includes a header 314. The header 314 includes a purchase requisition identifier 316, a total net amount 318, and an overall status 320. The total net amount 318 and the overall status 320 can be aggregated information that is derived from line item data. The event payload 312 for the example message 300 includes an approved line item 322. The approved line item 322 includes a line item identifier 324, a material indicator 326, a quantity 328, a price per unit 330, supplier information 332, and a line item status 334. An event that represents a change of a line item may result in a change in summary information included in the header 314. Accordingly, a new (e.g., updated) header is sent together with the line item associated with the event.

Using messages such as the example message 300 can result in significant overhead. For example, if a purchase requisition microservice automatically approves four line items of a same purchase requisition in a timeframe of a few seconds, four ItemApproved events may be sent. The four sent messages would include four events, each including four headers and four items. Each message can include technical metadata, and each header may include at least some redundant information with respect to headers of other messages.

Figure 3B:
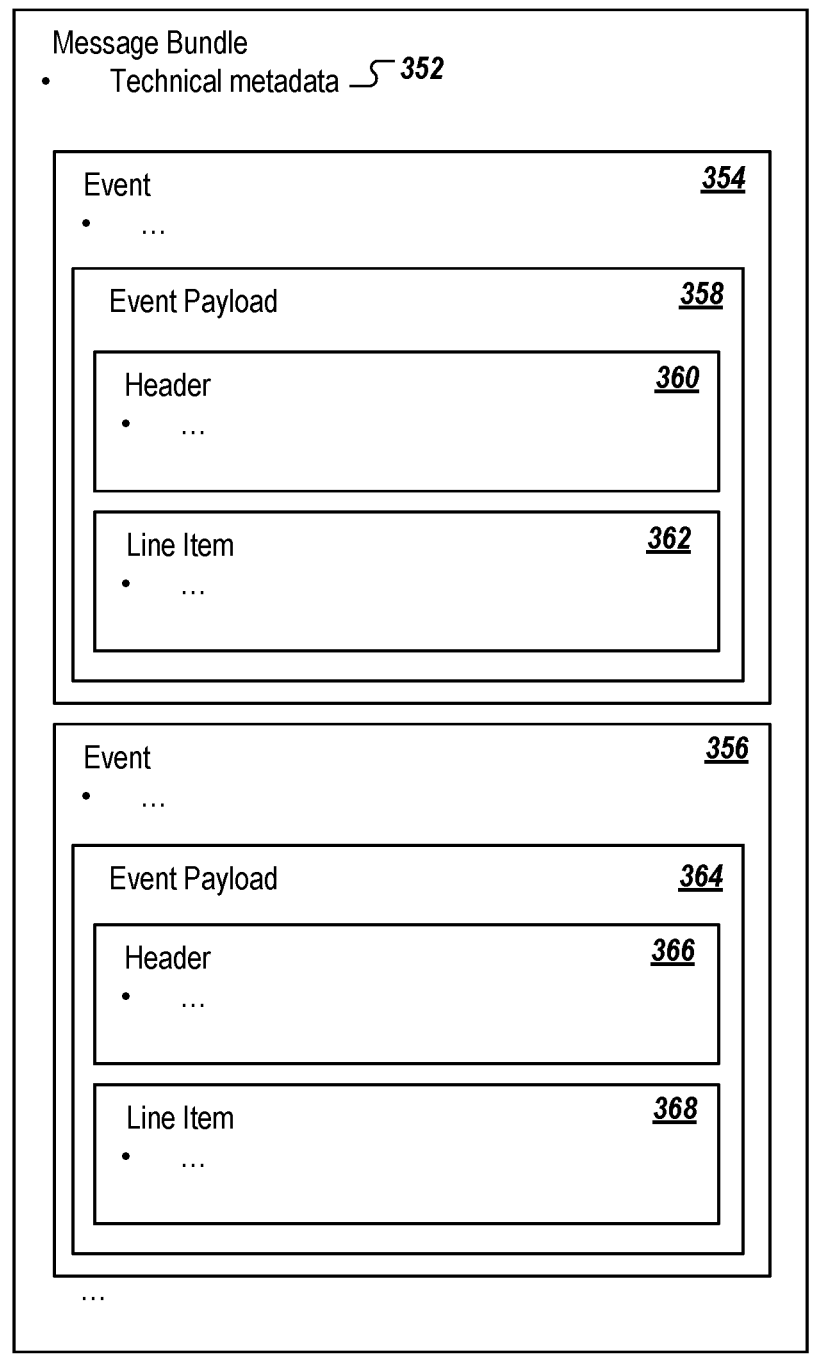
FIG. 3B illustrates an example bundled message.

FIG. 3B illustrates an example bundled message 350. Some message brokers support a basic form of message bundling. For example, instead of publishing an event directly, the message broker may be configured to wait for a predefined period of time to collect multiple messages that a service wants to send and send the collected messages as a message bundle. For example, the bundled message 350 includes a single set of technical metadata 352, a first event 354, a second event 356, and possibly other events. The first event 354 includes a payload 358 that includes a header 360 and a line item 362. Similarly, the second event 356 includes a payload 364 that includes a header 366 and a payload 368.

Although the bundled message 350 results in some cost savings (e.g., due to sending one message and due to including the single set of technical metadata 352 rather than separate sets of technical metadata), the bundled message 350 still includes redundant overhead. That is, with basic message broker message bundling enabled and configured, a sending of three messages may be saved but redundant data in multiple event headers is still sent. As described below, an improved bundling approach can be used that further reduces load on a message broker by intelligently bundling based on event payload information.

Figure 4:
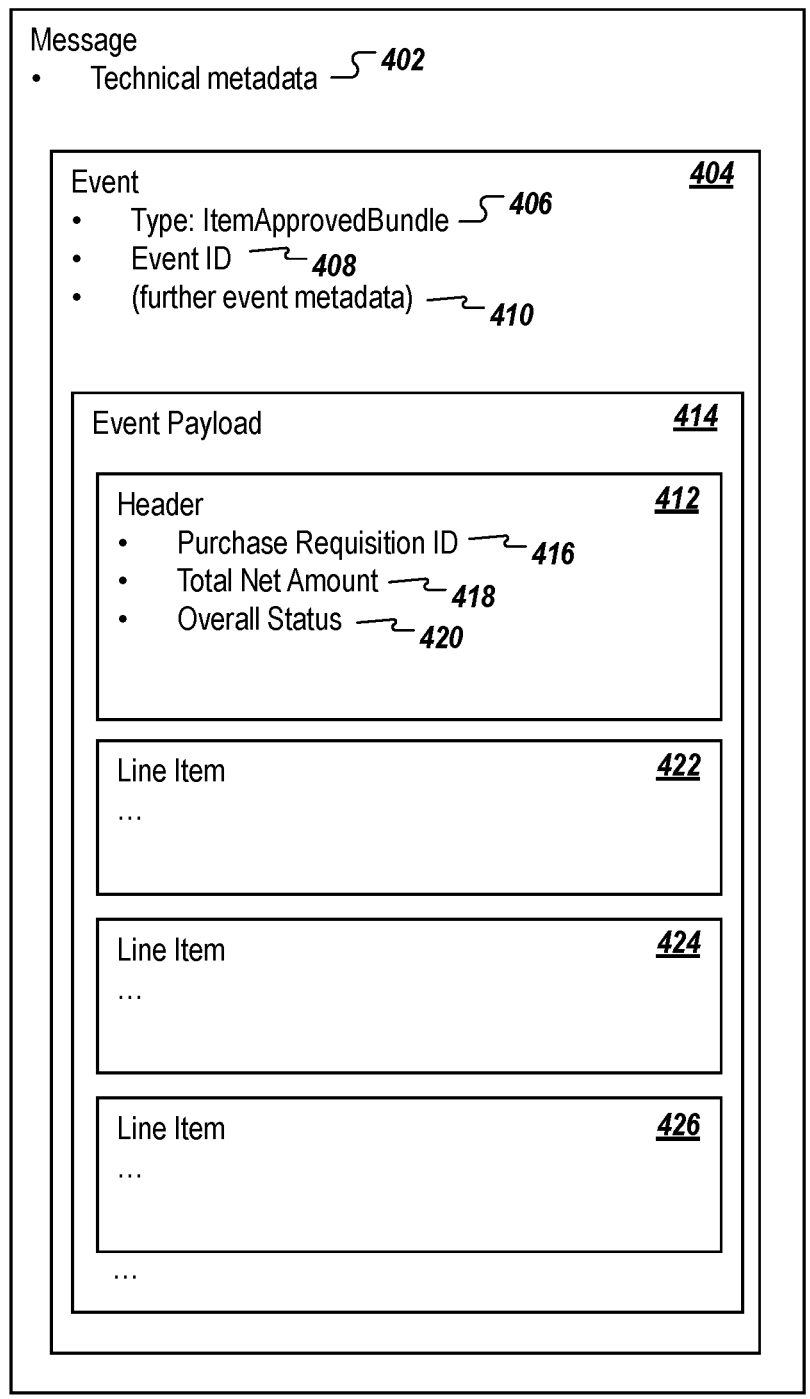
FIG. 4 illustrates an improved bundled message.

FIG. 4 illustrates an improved bundled message 400. As described in more detail below, the improved bundled message 400 can be generated by collecting, after an event of a certain type occurs for a given purchase requisition, other events that occur within a predefined timeframe of the same type and the same purchase requisition, and bundling the collected messages into the improved bundled message 400. The improved bundled message 400 includes a single set of technical metadata 402, a single set of event metadata 404 (e.g., including an event type of ItemApprovedBundle 406, an event identifier 408, and other event metadata 410), and a single event header 412 in an event payload 414. The single event header 412 includes a purchase requisition identifier 416, a total net amount 418, and an overall status 420.

The event payload 414 includes a list of line items (e.g., line items 422, 424, and 426) representing events that have been collected that are associated with the same event type (e.g., ItemApproved) and the purchase requisition identifier 416. Sending the improved bundled message 400 instead of multiple messages achieves a same overhead reduction as the bundled message 300 described above with respect to FIG. 3A (e.g., avoiding redundant technical metadata and avoiding a sending of multiple messages). Additionally, use of the improved bundled message 400 results in further overhead reduction, in that the single set of event metadata 404 is sent rather than multiple sets of event metadata for each of multiple messages. Furthermore, with respect to the event payload 414, the single event header 412 is sent rather than multiple event headers. The single event header 412 can include a latest header state of a last line item event collected into the bundle (e.g., the line item 426). The single event header 412 can include aggregated information about the multiple line items included in the improved bundled message 400. For example, the total net amount 418 can reflect a total net amount of the multiple line items and the overall status 420 can reflect an overall status of the multiple line items. For example, if all of the line items 422, 424, and 426 have an approved status, the overall status 420 can be an approved status, and if only some of the line items 422, 424, and 426 have an approved status, the overall status 420 can be a partially approved status.

The improved bundled message 400 uses more intelligent bundling than the bundled message 300, based on bundling items based on specific knowledge, conditions, and values of event attributes. For example, the improved bundled message 400 is bundled based on event type and purchase requisition identifier values.

Figure 5:
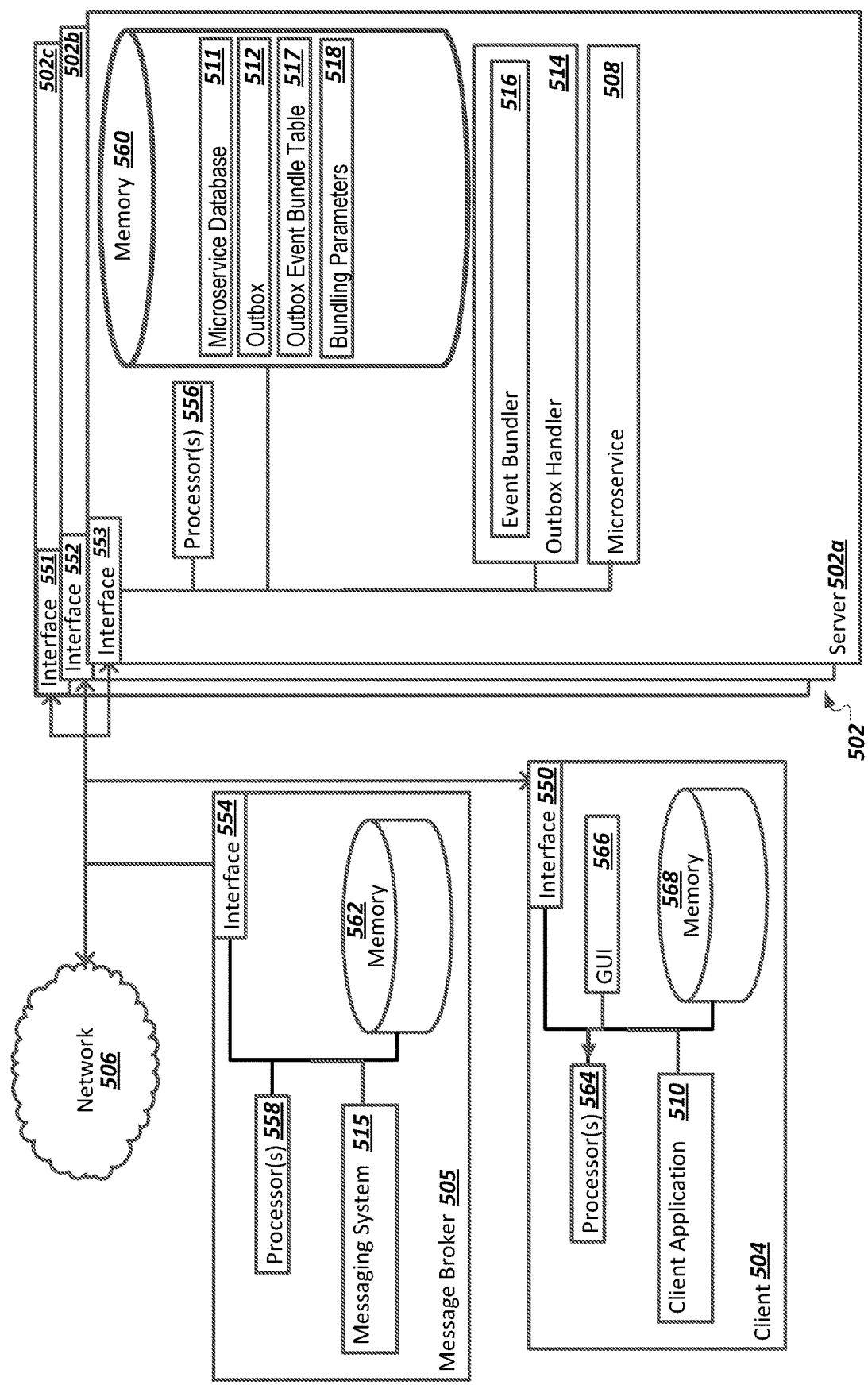
FIG. 5 is a block diagram illustrating an example system for bundling line item based events in an event-driven architecture.

FIG. 5 is a block diagram illustrating an example system 500 for bundling line item based events in an event-driven architecture. Specifically, the illustrated system 500 includes or is communicably coupled with servers 502 (e.g., including a server 502*a*, a server 502*b*, and a server 502*c*), a client device 504, a message broker 505 and a network 506. Each server in the servers 502 can performing processing for one or more microservices. As shown, the server 502*a* performs processing for a particular microservice 508 (e.g., the microservice 508 may be or correspond to a server process running on the server 502*a*). Although shown separately, in some implementations, functionality of two or more systems or servers may be provided by a single system or server. For example, although shown as a separate system, the message broker 505 may instead run on one or more of the servers 502. As another example, functionality of the servers 502*a*, 502*b*, and 502*c* may be performed on a single server. In some implementations, the functionality of one illustrated system, server, or component may be provided by multiple systems, servers, or components, respectively.

The microservice 508 can perform processing in response to a request. For example, the microservice 508 can receive a request from a client application 510 running on the client device 504 or from another microservice. As another example, the microservice 508 may perform processing in response to an internal condition occurring in the microservice 508 (e.g., related to periodic processing).

The microservice 508 can retrieve and/or store data from/to a microservice database 511 during processing of the request. As another example, the microservice 508 may generate a line-item based event as part of the processing of the request. The line-item based event can be targeted to another microservice, for the other microservice to perform additional processing related to a line item include in the line-item based event.

The microservice 508 can write the generated line-item based event to an outbox 512. The outbox 512 can hold outgoing events or messages in case the message broker 505 is offline (e.g., in an outbox event table as described below with respect to FIG. 6A). An outbox handler 514 can be configured to send events in the outbox 512, attempt resending if needed, etc. Messages can be sent using a messaging system 515 provided by the message broker 505.

Rather than send line-item based events immediately, an event bundler 516 can intelligently bundle line-item based events (e.g., into bundled messages such as the improved bundled message 400 described above with respect to FIG. 4). Open bundles can be defined using an outbox event bundling table 517 (e.g., as described below with respect to FIG. 6B). The event bundler 516 can bundle events based on bundling parameters 518. The bundling parameters 518 can include, for example, parameters for balancing message size and a maximum time window used for bundling.

Some bundling parameters 518 may be based on a type of the message broker 505. For example, the message broker 505 may have configurations such as a recommended message size, a maximum message size, etc. For best performance, messages in the system 500 can be configured to be in a range of the recommended size and the maximum message size. For line item based systems, a message size can depend on technical metadata and event data such as a header and multiple line items. To control overall message size, the event bundler 516 can determine and use a maximum line items per bundle parameter. As another example of a bundling parameter 518, the event bundler 516 can configure a maximum delay (e.g., a time window) during which the event bundler 516 waits for events to include in a bundle. The maximum delay for a particular microservice may depend on requirements or needs of the microservice. Accordingly, different microservices may have different maximum delay configurations.

The system 500 can be used for bundling line item events for different types of line item processing. Procurement systems are one type of line item processing system. Other types of line item based systems can incorporate line item bundling.

Event bundling can be based on bundling events of a same type, for a same document. Example event types may include item approval, item change, item withdrawal, etc. Other types of events can be used for bundling. An example document is a purchase requisition. Bundling can occur for same event types that each have a same document identifier, such as a same purchase requisition identifier, to control event ordering for same-document events. Other types of documents and other types of document identifiers can be used for bundling. For some types of documents and/or events, bundling can occur across documents, such as for document types where ordering is not required. Accordingly, an ordering criterion might be used but is not required, and different ordering criteria may be used for different types of documents. Ordering criterion information can be included in the bundling parameters 518.

In further detail, the ordering criterion can ensure that events are published in a same order as they occurred in the microservice 508. Maintaining order is important, for example, for listening services, as triggered processes in listening services can depend on the sequence in which events happen. In some implementations, publishing order (e.g., an order in which a receiving services receives events) may be configured to correspond exactly to event generation order. In other cases, more refined (or relaxed) ordering conditions may be used. For example, in some cases order may only be critical for certain groups of events. For example, events relating to a purchase requisition may include a purchase requisition identifier in the event header that identifies a particular requisition document. Based on an assumption that different requisition documents will be processed independently from each other, a strict order of events that happen for a same requisition can be maintained but ordering across requisition documents may not be required or performed.

In general, the bundling parameters 518 can include various parameters that control the event bundler 516 bundling events into a bundled message until a stopping condition occurs, with the stopping condition based on a maximum size being reached, a maximum delay being reached, or, when an ordering criterion such as a document identifier is configured, receiving an event that has a same document identifier but a different event than an open bundle.

For some types of events, only a header of a last event included in the bundle is included in a bundled message. Header aggregation can be performed, to include aggregated information, e.g., in the header, that aggregates information from events included in the bundle. Other details, features, and processing related to bundling are discussed in more detail below.

As used in the present disclosure, the term "computer" is intended to encompass any suitable processing device. For example, although FIG. 5 illustrates a different servers 502, and a single client device 504, the system 500 can be implemented using a single, stand-alone computing device, more than three servers 502, or two or more client devices 504. Indeed, each of the servers 502 and the client device 504 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, each of the servers 502 and the client device 504 may be adapted to execute any operating system, including Linux, UNIX, Windows, Mac OS®, Java™, Android™, iOS or any other suitable operating system. According to one implementation, each server 502 may also include or be communicably coupled with an e-mail server, a Web server, a caching server, a streaming data server, and/or other suitable server.

Interfaces 550, 551, 552, 553, and 554 are used by the client device 504, the server 502a, the server 502b, the server 502c, and the message broker 505, respectively, for communicating with other systems in a distributed environment—including within the system 500—connected to the network 506. Generally, the interfaces 550, 551, 552, 553, and 554 each comprise logic encoded in software and/or hardware in a suitable combination and operable to communicate with the network 506. More specifically, the interfaces 550, 551, 552, 553, and 554 may each comprise software supporting one or more communication protocols associated with communications such that the network 506 or interface's hardware is operable to communicate physical signals within and outside of the illustrated system 500.

The server 502*a* includes one or more processors 556. Each processor 556 may be a central processing unit (CPU), a blade, an application specific integrated circuit (ASIC), a field-programmable gate array (FPGA), or another suitable component. Generally, each processor 556 executes instructions and manipulates data to perform the operations of the server 502*a*. Specifically, each processor 556 executes the functionality required to receive and respond to requests from the client device 504 or from another server 502, for example. The server 502*b* and the server 502*c* (and other servers in the system 500) can include similar processor(s). Similarly, the message broker 505 includes one or more processor(s) 558.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 5 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 502*a* includes memory 560. In some implementations, the server 502 includes multiple memories. The memory 560 may include any type of memory or database module and may take the form of volatile and/or non-volatile memory including, without limitation, magnetic media, optical media, random access memory (RAM), read-only memory (ROM), removable media, or any other suitable local or remote memory component. The memory 560 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 502*a*. The server 502*b* and the server 502*c* (and other servers in the system 500) can include similar memory. Additionally, the message broker 505 includes memory 562.

The client device 504 may generally be any computing device operable to connect to or communicate with the servers 502 via the network 506 using a wireline or wireless connection. In general, the client device 504 comprises an electronic computer device operable to receive, transmit, process, and store any appropriate data associated with the system 500 of FIG. 5. The client device 504 can include one or more client applications, including the client application 510. A client application is any type of application that allows the client device 504 to request and view content on the client device 504. In some implementations, a client application can use parameters, metadata, and other information received at launch to access a particular set of data from a particular server 502. In some instances, a client application may be an agent or client-side version of the one or more enterprise applications running on an enterprise server (not shown).

The client device 504 further includes one or more processors 564. Each processor 564 included in the client device 504 may be a central processing unit (CPU), an application specific integrated circuit (ASIC), a field-programmable gate array (FPGA), or another suitable component. Generally, each processor 564 included in the client device 504 executes instructions and manipulates data to perform the operations of the client device 504. Specifically, each processor 564 included in the client device 504 executes the functionality required to send requests to a server 502 and to receive and process responses from the respective server 502.

The client device 504 is generally intended to encompass any client computing device such as a laptop/notebook computer, wireless data port, smart phone, personal data assistant (PDA), tablet computing device, one or more processors within these devices, or any other suitable processing device. For example, the client device 504 may comprise a computer that includes an input device, such as a keypad, touch screen, or other device that can accept user information, and an output device that conveys information associated with the operation of the server 502, or the client device 504 itself, including digital data, visual information, or a GUI 566.

The GUI 566 of the client device 504 interfaces with at least a portion of the system 500 for any suitable purpose, including generating a visual representation of the client application 510. In particular, the GUI 560 may be used to view and navigate various Web pages, or other user interfaces. Generally, the GUI 566 provides the user with an efficient and user-friendly presentation of business data provided by or communicated within the system. The GUI 566 may comprise a plurality of customizable frames or views having interactive fields, pull-down lists, and buttons operated by the user. The GUI 566 contemplates any suitable graphical user interface, such as a combination of a generic web browser, intelligent engine, and command line interface (CLI) that processes information and efficiently presents the results to the user visually.

Memory 568 included in the client device 504 may include any memory or database module and may take the form of volatile or non-volatile memory including, without limitation, magnetic media, optical media, random access memory (RAM), read-only memory (ROM), removable media, or any other suitable local or remote memory component. The memory 568 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 504.

There may be any number of client devices 504 associated with, or external to, the system 500. For example, while the illustrated system 500 includes one client device 504, alternative implementations of the system 500 may include multiple client devices 504 communicably coupled to the server 502 and/or the network 506, or any other number suitable to the purposes of the system 500. Additionally, there may also be one or more additional client devices 504 external to the illustrated portion of system 500 that are capable of interacting with the system 500 via the network 506. Further, the term "client", "client device" and "user" may be used interchangeably as appropriate without departing from the scope of this disclosure. Moreover, while the client device 504 is described in terms of being used by a single user, this disclosure contemplates that many users may use one computer, or that one user may use multiple computers.

FIG. 6A illustrates an example outbox event table 600. As mentioned, an outbox can be used by a microservice to store events before events are sent to a message broker. The outbox event table can store values for various fields for each event. For the example, the outbox event table 600 includes an event identifier column 602 that stores event identifiers that each uniquely identify an event, an event time column 604 that stores timestamps indicating when respective events occurred, an event type column 606 that stores an event type for each event, and a requisition identifier column 608 that stores requisition identifiers that have been extracted from event payloads that are stored in a payload column 610. As described below, outbox handling can be enhanced to implement the improved message bundling approach.

Figure 7:
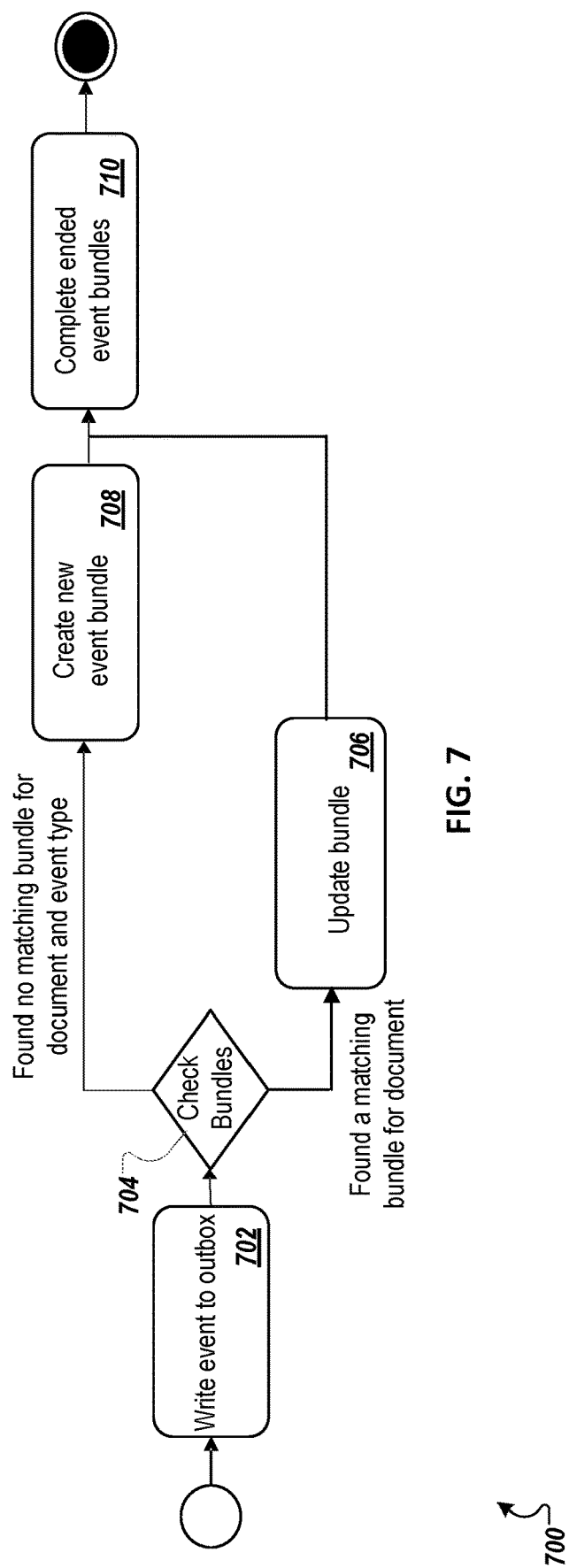
FIG. 7 illustrates a flowchart of an example method for handling a new event.

FIG. 6B illustrates an example outbox event bundle table 650. The outbox event bundle table 650 can be used to store information about message bundles. The outbox event bundle table 650 includes a bundle identifier column 652 that stores bundle identifiers that each uniquely identify a bundle, an event type column 654 that stores event type indicators that each indicate an event type of messages in a respective bundle, a requisition identifier column 656 that stores requisition identifier values that each identify a requisition document to which events in a respective bundle are associated, a start time column 658 that stores start times of respective bundles, an end time column 660 that stores end times of respective bundles, and an event counter column 662. Event type, requisition identifier, and start time and end time values can define selection criteria for determining which events are bundled together. The event counter column 662 can be used to aggregate a number of events in each bundle that match the selection criteria. As described below, bundles may have a maximum number of events that can be included in a given bundle FIG. 7 illustrates a flowchart of an example method 700 for handling a new event. At 702, a new event is written to the outbox event table. At 704, a check is performed for existing open bundles. The check can include determining whether a matching open bundle exists for a same requisition document and same event type as the new event with a defined start and end time range that includes the creation time stamp of the new event. At 706, if a matching open bundle is found, the matching open bundle is updated. Updating the matching open bundle can include incrementing an event counter associated with the bundle.

At 708, if no matching open bundles exist with a same requisition identifier and same event type as the new event, a new bundle is created with a same event type and same requisition identifier as the new event. The start date of the new bundle is set to the creation date of the new event and the end date of the new bundle is set to be a value equal to the start date of the new event plus a predefined period of time. An event counter for the bundle can have an initial value of one.

At 710, after a matching open event bundle is updated (e.g., at 706) or after a new event bundle is created (e.g., at 708) a complete ended event bundles process is performed. The complete ended event bundles process is described below with respect to FIG. 9.

Figure 8:
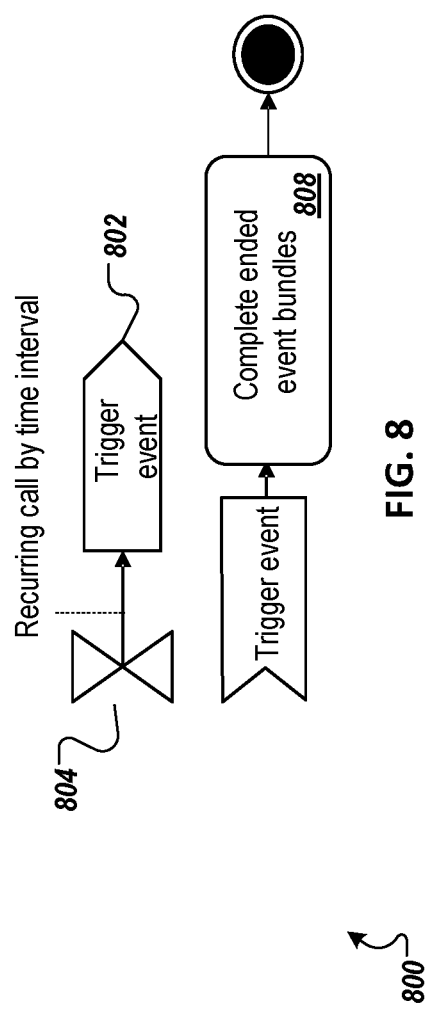
FIG. 8 is a flowchart of an example method for checking existing bundles.

FIG. 8 is a flowchart of an example method 800 for checking existing bundles. The method 800 can be performed in response to a trigger event 802. The trigger event 802 can be, for example, a timer event for a timer 804 that fires on an interval basis (e.g., every minute). At 806, in response to the trigger event 802, the complete ended event bundles process is performed, as described below for FIG. 9.

Figure 9:
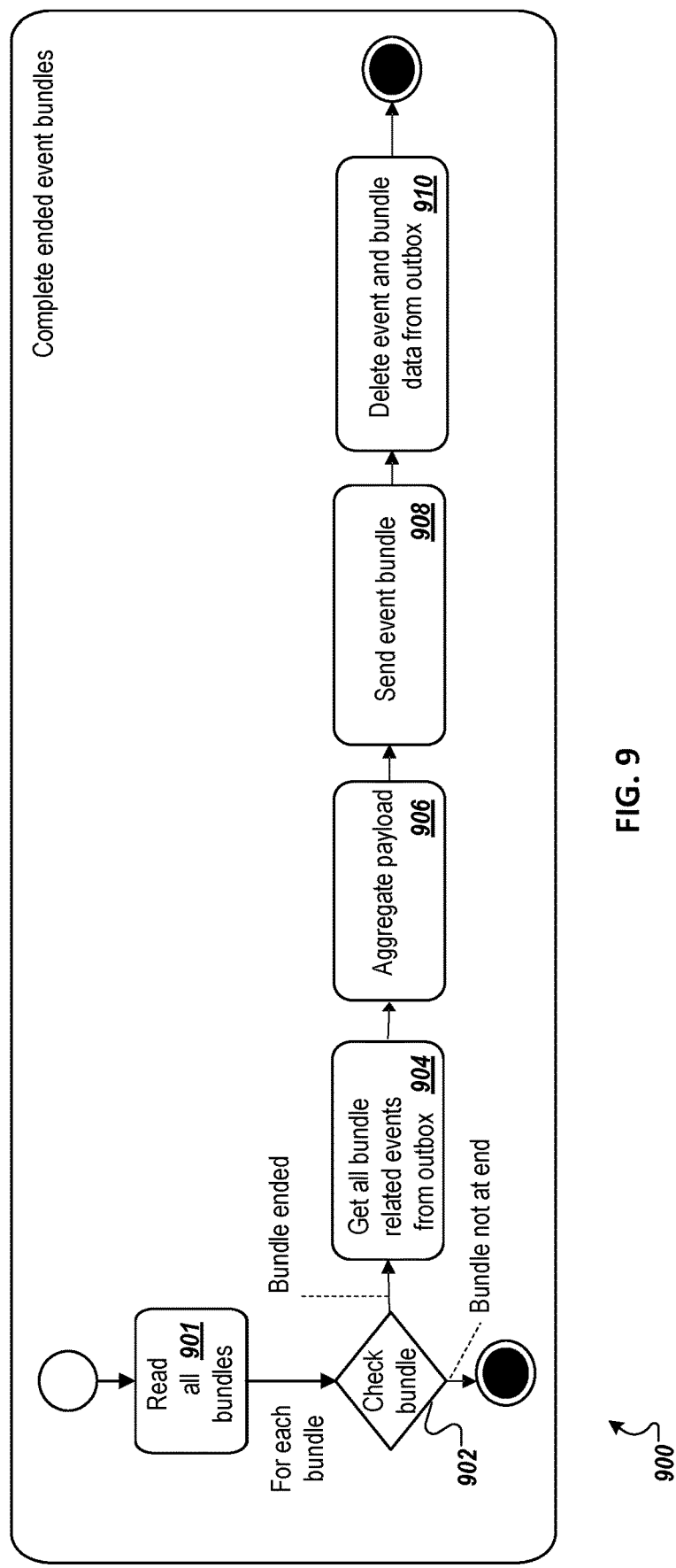
FIG. 9 is a flowchart of an example method for a complete ended event bundles process.

FIG. 9 is a flowchart of an example method 900 for a complete ended event bundles process. At 901, all open bundles are read. The remainder of the process 900 (e.g., steps 902 to 910) can be performed for each given read bundle. For example, at 902, a determination is made as to whether the bundle has ended. Ending conditions for a bundle can include an end time for the bundle being exceeded, a maximum number of events having been collected for the bundle, or if a new event for the same requisition document but with a different event type has been written to the outbox.

At 904, in response to detection of a bundle-ending condition, all bundle-related events for the bundle are retrieved from the outbox. At 906, aggregate information is determined from payload data of the retrieved bundle-related events. For example, a header of a latest bundle-related event can be retrieved and included in a bundled message for the bundle. Additionally, respective line items for each of the retrieved bundle-related messages can be appended to the bundled message. At 908, the bundled message is sent to the message broker. At 910, bundle-related events are deleted from the outbox and a bundle entry in the event bundle table can be deleted.

FIGS. 10A-10C illustrate a first example of bundle creation. FIG. 10A is a table 1000 that includes bundling parameters for the first example of bundle creation. An ordering criterion parameter 1002 has a value of requisition identifier 1004, indicating that bundling to preserve order of events within requisition documents is configured. A maximum line items per bundle parameter 1006 has a value of four 1008, indicating that, for this example, at most four events are included in a bundle. In practice, a maximum lines items per bundle setting may be set significantly higher than four. A maximum delay parameter 1010 has a value of 60 seconds 1012, indicating that after a bundle is created with a first event, other events that happen within the 60 second time window may also be included in the bundle along with the first event.

FIG. 10B illustrates an example outbox event table 1040. A first event 1042 occurs at a time of 8:30:01 1044. The first event 1042 has a requisition identifier 1046 value of 4711 and an event type 1048 of ItemApproved. In response to the first event 1042, a first bundle is created.

FIG. 10C illustrates an example outbox event bundle table 1060. The outbox event bundle table 1060 includes an entry 1062 for the first bundle, for the requisition identifier 1064 of 4711 and an event type 1066 of ItemApproved. The first bundle has a start time 1068 equal to the event time 1044 of the first event and an end time 1070 equal to the start time of the first bundle plus 60 seconds in accordance with the maximum delay parameter 1010. In response to the first event 1042, an event counter 1071 is set to an initial value of one (the value of one is shown as crossed out due to later adjustments of the event counter 1071).

Referring again to FIG. 10B, a second event 1050 occurs, before the maximum delay since the first event 1042, with a same requisition identifier value and same event type as the first event. Accordingly, the second event 1050 can be included in the first bundle. That is, the event counter 1071 in the entry 1062 in FIG. 10C can be incremented, to a new value of two.

A third event 1052 occurs, before the maximum delay since the first event 1042, but with a different event type (e.g., ItemWithdrawn 1054) and a different requisition identifier 1056 (e.g., a value of 4712) than the first event 1042. A second bundle can be created in response to the third event 1052. If the third event 1052 had a same requisition identifier as the first event 1042 with a different event type than the first event 1042 then the first bundle 1042 would be closed. However, since the third event 1052 has a different requisition identifier than the first event 1042, the first bundle remains open.

Referring again to FIG. 10C, the outbox event bundle table 1060 includes a second entry 1072 for the second bundle. The second bundle has an event type 1074 of ItemWithdrawn and a requisition identifier 1076 of 4712. The second bundle has a start time 1078 equal to the event time of the third event 1052 and an end time 1080 equal to the start time of the second bundle plus 60 seconds in accordance with the maximum delay parameter 1010. In response to the third event 1052, an event counter 1081 is set to an initial value of one.

Referring again to FIG. 10B, a fourth event 1058 and a fifth event 1059 occur before the maximum delay after the first event 1042. Accordingly, the fourth event 1058 and the fifth event 1059 are included in the first bundle. That is, the event counter 1071 in the entry 1062 in FIG. 10C can be incremented twice, first to a value of three and next to a value of four, as currently displayed. The occurrence of the fifth event 1059 can trigger closure and sending of the first bundle, since the fifth event 1059 being included in the first bundle causes a count of events in the first bundle (e.g., the value of the event counter 1071) to match the value 1008 of the maximum line items per bundle parameter 1006.

After the first bundle is sent, entries in the outbox event table 1040 for the first event 1042, the second event 1050, the fourth event 1058, and the fifth event 1059 can be removed from the outbox event table 1040. Additionally, the first entry 1062 in the outbox event bundle table 1060 can be removed in response to sending of the first bundle.

The second bundle can be closed, for example, when the end time 1080 is reached. After the second bundle is sent, the third event 1052 entry in the outbox event table 1040 and the second entry 1072 in the outbox event bundle table 1060 can be removed.

FIGS. 11A-11B illustrate a second example of bundle creation. The second example uses the same bundling parameters described above in FIG. 10A. FIG. 11A illustrates an example outbox event table 1100. A first event 1102 occurs at a time of 8:30:01 1104. The first event 1102 has a requisition identifier 1106 value of 4711 and an event type 1108 of ItemApproved. In response to the first event 1102, a first bundle is created.

FIG. 11B illustrates an example outbox event bundle table 1150. The outbox event bundle table 1150 includes an entry 1152 for the first bundle, for a requisition identifier 1154 of 4711 and an event type 1156 of ItemApproved. The first bundle has a start time 1158 equal to the event time 1104 of the first event 1102 and an end time 1160 equal to the start time of the first bundle plus 60 seconds in accordance with the maximum delay parameter 1010. In response to the first event 1102, an event counter 1161 is set to an initial value of one (the value of one is shown as crossed out due to later adjustments of the event counter 1161).

Referring again to FIG. 11A, a second event 1110 occurs, before the maximum delay since the first event 1102, with a same requisition identifier value and same event type as the first event 1102. Accordingly, the second event 1110 can be included in the first bundle. That is, the event counter 1161 in the entry 1152 in FIG. 11B can be incremented, to a new value of two.

A third event 1112 occurs, before the maximum delay since the first event 1102, but with a different event type (e.g., ItemWithdrawn 1114) than the first event 1102. A second bundle can be created in response to the third event 1112, based on the ItemWithdrawn event type 1114 being different from the ItemApproved event type 1108 of the first event 1102. Additionally, the first bundle can be closed and sent, and entries in the outbox event table 1100 and the outbox event bundle table 1150 that correspond to the first bundle can be removed.

Referring again to FIG. 11B, the outbox event bundle table 1150 includes a second entry 1162 for the second bundle. The second bundle has an event type 1164 of ItemWithdrawn and a requisition identifier 1166 of 4711. The second bundle has a start time 1168 equal to the event time of the third event 1112 and an end time 1170 equal to the start time of the second bundle plus 60 seconds in accordance with the maximum delay parameter 1010. In response to the third event 1112, an event counter 1171 is set to an initial value of one.

Referring again to FIG. 11A, a fourth event 1118 occurs. The fourth event 1118 has a requisition identifier 1120 value of 4711 and an event type 1122 of ItemApproved. In response to the fourth event 1118, a third bundle is created (e.g., since the first bundle having the same requisition identifier and same event type had already been closed). Additionally, in response to creation of the third bundle, the second bundle can be closed and sent, and entries in the outbox event table 1100 and the outbox event bundle table 1150 that correspond to the second bundle can be removed.

A fifth event 1124 occurs, with the fifth event 1124 having a same requisition identifier and same event type as the third bundle. Accordingly, the fifth event included in the third bundle. The third bundle can be subsequently closed, for example, after reaching a maximum number of items, after the maximum delay has occurred, or after another event for a same requisition identifier but different event type is received.

Referring again to FIG. 11B, the outbox event bundle table 1150 includes a third entry 1172 for the third bundle. The third bundle has an event type 1174 of ItemWithdrawn and a requisition identifier 1176 of 4711. The third bundle has a start time 1178 equal to the event time of the fourth event 1118 and an end time 1180 equal to the start time of the third bundle plus 60 seconds in accordance with the maximum delay parameter 1010. In response to the fourth event 1118, an event counter 1181 is set to an initial value of one (which is shown crossed out due to a subsequent incrementing of the event counter to a value of two in response to the fifth event 1124).

FIG. 12 is a flowchart of an example method for bundling line item based events in an event-driven architecture. It will be understood that method 1200 and related methods may be performed, for example, by any suitable system, environment, software, and hardware, or a combination of systems, environments, software, and hardware, as appropriate. For example, one or more of a client, a server, or other computing device can be used to execute method 1200 and related methods and obtain any data from the memory of a client, the server, or the other computing device. In some implementations, the method 1200 and related methods are executed by one or more components of the system 500 described above with respect to FIG. 5. For example, the method 1200 and related methods can be executed by the event bundler 516 of FIG. 5.

At 1202, a first new line-item based event is received, at a message outbox of a first microservice. The first new line-item based event can include a first line item, a first event type, and a first document identifier. Document identifiers can serve as an ordering criterion for grouping line-item based events of a same event type and same document instance and maintaining an order of line-item based events of the same event type within a given bundled event message.

At 1204, a determination is made as to whether a first compatible open event bundle can be located. Locating the first compatible open event bundle can include locating an open event bundle that has a same event type as the first event type or locating an open event bundle that has a same event type as the first event type and a same document identifier as the first document identifier.

At 1206, in response to determining that a first compatible open event bundle cannot be located, a first compatible open event bundle is created as a first new open event bundle. During the determination of whether the first compatible open event bundle can be located, a first incompatible open event bundle can be located that includes a same document identifier as the first document identifier but a different event type than the first event type. That is, the first incompatible open event bundle is considered incompatible due to having a different type. The first incompatible open event bundle can be closed before the first compatible open event bundle is created.

At 1208, the first compatible open event bundle (e.g., either the first compatible open event bundle that was located at step 1204 or the first compatible open event bundle that was created at step 1206) is updated to include the first new line-item based event. Updating the first compatible open event bundle can include incrementing an event counter for the first compatible open event bundle to reflect the inclusion of the first new line-item based event in the first compatible open event bundle At 1210, a determination is made that a closing condition has occurred for the first compatible open event bundle. Determining that the closing condition has occurred for the first compatible open event bundle can include determining that the first compatible open event bundle includes a predefined maximum number of events. Determining that the closing condition has occurred for the first compatible open event bundle can include determining that a predefined maximum amount of time has occurred since the first compatible open event bundle was created. Determining that the closing condition has occurred for the first compatible open event bundle can include receiving, at the message outbox, a second new line-item based event that has a same document identifier as the first document identifier but a different event type than the first event type.

At 1212, the first compatible open event bundle is closed in response to determining that the closing condition has occurred. Closing the first compatible open event bundle can include: generating a first bundled event message based on the first compatible open event bundle, sending the first bundled event message to a second microservice, and deleting events associated with the first bundled event message from the message outbox. When determining that the closing condition has occurred for the first compatible open event bundle includes receiving a second new line-item based event that has a same document identifier as the first document identifier but a different event type than the first event type, a second new open event bundle can be created and the second new line-item based event can be added to the second new open event bundle.

Generating the first bundled event message based on the first compatible open event bundle can involve including a respective line item in the bundled event message for each line item included in the first compatible open event bundle. As another example, generating the first bundled event message based on the first compatible open event bundle can include creating aggregate line item information from the line items included in the first bundled event message and including the aggregate line item information in the first bundled event message.

The preceding figures and accompanying description illustrate example processes and computer-implementable techniques. But system 500 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 500 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   receiving, at a message outbox of a first microservice, a first new line-item based event comprising line item details for at least one line item of a document;
   attempting to locate a first compatible open event bundle for the document that has line items of a same event type as the first new line-item based event;
   in response to locating the first compatible open event bundle for the document, adding the first new line-item based event to the first compatible open event bundle;
   in response to determining that the first compatible open event bundle cannot be located:
     creating the first compatible open event bundle as a first new open event bundle; and
     adding the first new line-item based event to the first new open event bundle;
   determining that a closing condition has occurred for the first compatible open event bundle; and
   closing the first compatible open event bundle, wherein the closing comprises:

generating a first bundled event message that includes line-item based messages for the document of the same event type included in the first compatible open event bundle; and sending the first bundled event message to a second microservice.

2. The computer-implemented method of claim 1, wherein the first new line-item based event includes a first line item, a first event type, and a first document identifier.

3. The computer-implemented method of claim 2, wherein locating the first compatible open event bundle comprises locating an open event bundle that has a same event type as the first event type.

4. The computer-implemented method of claim 3, wherein locating the first compatible open event bundle comprises locating an open event bundle that has a same event type as the first event type and a same document identifier as the first document identifier.

5. The computer-implemented method of claim 4, wherein document identifiers serve as a ordering criterion for grouping line-item based events of a same event type and same document instance and maintaining an order of line-item based events of the same event type within a given bundled event message.

6. The computer-implemented method of claim 1, wherein determining that the closing condition has occurred for the first compatible open event bundle comprises determining that the first compatible open event bundle includes a predefined maximum number of events.

7. The computer-implemented method of claim 1, wherein determining that the closing condition has occurred for the first compatible open event bundle comprises determining that a predefined maximum amount of time has occurred since the first compatible open event bundle was created.

8. The computer-implemented method of claim 2, wherein determining that the closing condition has occurred for the first compatible open event bundle comprises receiving, at the message outbox, a second new line-item based event that has a same document identifier as the first document identifier but a different event type than the first event type.

9. The computer-implemented method of claim 8, further comprising, after closing the first open compatible event bundle:
creating a second new open event bundle; and
adding the second new line-item based event to the second new open event bundle.

10. The computer-implemented method of claim 8, wherein attempting to locate the first compatible open event bundle comprises locating a first incompatible open event bundle that includes a same document identifier as the first document identifier but a different event type than the first event type.

11. The computer-implemented method of claim 10, further comprising:
closing the first incompatible open event bundle before creating the first compatible open event bundle.

12. The computer-implemented method of claim 1, wherein generating the first bundled event message comprises including a respective line item in the bundled event message for each line item included in the first compatible open event bundle.

13. The computer-implemented method of claim 1, wherein generating the first bundled event message creating aggregate line item information from the line items included in the first bundled event message and including the aggregate line item information in the first bundled event message.

14. The computer-implemented method of claim 1, wherein closing the first compatible open event bundle comprises deleting events associated with the first bundled event message from the message outbox.

15. A system comprising:
one or more computers; and
a computer-readable medium coupled to the one or more computers having instructions stored thereon which, when executed by the one or more computers, cause the one or more computers to perform operations comprising:
receiving, at a message outbox of a first microservice, a first new line-item based event comprising line item details for at least one line item of a document;
attempting to locate a first compatible open event bundle for the document that has line items of a same event type as the first new line-item based event;
in response to locating the first compatible open event bundle for the document, adding the first new line-item based event to the first compatible open event bundle;
in response to determining that the first compatible open event bundle cannot be located:
creating the first compatible open event bundle as a first new open event bundle; and
adding the first new line-item based event to the first new open event bundle;
determining that a closing condition has occurred for the first compatible open event bundle; and
closing the first compatible open event bundle, wherein the closing comprises:
generating a first bundled event message that includes line-item based messages for the document of the same event type included in the first compatible open event bundle; and
sending the first bundled event message to a second microservice.

16. The system of claim 15, wherein the first new line-item based event includes a first line item, a first event type, and a first document identifier.

17. The system of claim 16, wherein locating the first compatible open event bundle comprises locating an open event bundle that has a same event type as the first event type.

18. A computer program product encoded on a non-transitory storage medium, the product comprising non-transitory, computer readable instructions for causing one or more processors to perform operations comprising:
receiving, at a message outbox of a first microservice, a first new line-item based event comprising line item details for at least one line item of a document;
attempting to locate a first compatible open event bundle for the document that has line items of a same event type as the first new line-item based event;
in response to locating the first compatible open event bundle for the document, adding the first new line-item based event to the first compatible open event bundle;
in response to determining that the first compatible open event bundle cannot be located:
creating the first compatible open event bundle as a first new open event bundle; and
adding the first new line-item based event to the first new open event bundle;

determining that a closing condition has occurred for the first compatible open event bundle; and closing the first compatible open event bundle, wherein the closing comprises:
generating a first bundled event message that includes line-item based messages for the document of the same event type included in the first compatible open event bundle; and
sending the first bundled event message to a second microservice.

19. The computer program product of claim 18, wherein the first new line-item based event includes a first line item, a first event type, and a first document identifier.

20. The computer program product of claim 19, wherein locating the first compatible open event bundle comprises locating an open event bundle that has a same event type as the first event type.

* * * * *